United States Patent Office 3,332,893
Patented July 25, 1967

3,332,893
FLAME-RESISTANT POLYURETHANES
Gail H. Birum, Kirkwood, and Rodney B. Clampitt and Richard M. Anderson, St. Louis, Mo., assignors to Monsanto Company, St. Louis, Mo., a corporation of Delaware
No Drawing. Filed June 11, 1964, Ser. No. 374,269
5 Claims. (Cl. 260—2.5)

This invention relates to flame-resistant polyurethane materials. More particularly, this invention relates to the production of polyurethane polymers containing chemically bonded phosphorus therein and especially to the production of flexible and rigid polyurethane foam materials containing chemically bonded phosphorus therein.

In polyurethanes, producers thereof have been incorporating phosphorus as a flame retardant in the form of various phosphorus compounds and compositions into polyurethane-forming ingredient mixtures. It is known that flame resistance may be imparted to polyurethane materials by incorporating unreactive phosphorus compounds such as esters thereof, e.g., the trialkyl phosphates such as triethyl phosphate, trimethyl phosphate, and tris(2-chloroethyl)phosphate, into the polyol-polyisocyanate reactant mixture. However, polyurethane materials containing phosphorus in unreacted form, i.e., not chemically bonded to the polymer chain, suffer the disadvantage of being susceptible to loss of the phosphorus compound by volatilization, by leaching out by solvents or water, or by being squeezed out by pressure over a period of time. Such materials also have the disadvantage of plasticizing or softening the polyurethane product, thus harming important physical properties of the polyurethane.

Polyester polyols and organic polyols containing phosphorus ester groups chemically bonded therein have also been used to incorporate phosphorus into polymer systems such as polyurethanes. This has been done, e.g., by treating phosphoric acid with ethylene oxide or propylene oxide and reacting the resulting phosphorus-containing ester polyol with the polyisocyanate to form the polyurethane. Polyphosphoric acid has been treated in a similar manner to obtain polyester polyols for use in polyurethanes. However, polyurethanes made with such materials are deficient either because of possible degradation by moisture, or because of lowering of desired physical properties of the polyurethane by using enough of the phosphorus-containing ester polyol to achieve the desired flame-resistance. Most of the presently commercial products of this type contain at least two or three hydrolyzable phosphorus-ester linkages that can be coupled in the polymer backbone ofr each phosphorus atom. It is desirable, therefore, to find organic phosphorus compounds and compositions which have sufficient difunctionality and which have as few hydrolyzable ester groups per phosphorus atom as is practicable so that the phosphorus may be chemically affixed into the polymer system in a stable form while at the same time providing for the use of as low an amount as possible of the phosphorus compound or product to impart to the polymer system the desired flame-resistant property without substantially impairing the good physical properties of the polymer system to which it is added.

Briefly, we have found by this invention that new polyurethane materials having good flame retardant or fire resistant properties may be obtained by incorporating into the reactant mixture used to prepare the polyurethane a small but flame resistance imparting amount of a hydroxyalkyl alpha-hydroxyalkylphosphonate product mixture and allowing the reactant mixture to polymerize to a polyurethane. This product mixture is prepared by reacting sufficient water and an alkanecarboxaldehyde with a neutral phospholane ester to open the phospholane ring and to form the hydroxyalkyl alpha-hydroalkylphosphonate. The amount of water used is, however, insufficient to cause formation of any substantial amount of product degradation. The difunctional product mixture thus obtained has the advantage over prior art materials of having only one or less phosphorus ester linkages that can be coupled in the polymer backbone per phosphorus atom whereas most of the prior art products contain two or three such ester linkages per phosphorus atom. The products of this invention also have moderately high phosphorus content (average of about 15.5%) compared to 12.5 percent or lower for most prior art materials. There may be used any amount of the hydroxyalkyl alpha-hydroxyalkylphosphonate sufficient to impart some flame resistance to the resulting polyurethane product as compared to a polyurethane containing no such flame retarding compound. Amounts used, however, are normally in the range sufficient to provide from about 0.1 to about 3.5 percent, by weight, of phosphorus, based on the total composition. Preferred ranges are usually from about 0.5 to about 2.5 percent of phosphorus in the form of these hydroxyalkyl alpha-hydroxyalkylphosphonate products.

The fire-resistant polyurethanes of this invention may be prepared by combining (A) a polyol, (B) an organic polyisocyanate, (C) a catalyst, and (D) the hydroxyalkyl alpha-hydroxyalkylphosphonate product mixture, and allowing the resulting mixture to polymerize. When a fire resistant polyurethane foam is being prepared in accordance with this invention, there is also included in the reactant mixture (E) a foaming agent or inflatant, and generally (F) a surfactant to improve the quality of the foam structure.

The preferred mode of preparing the hydroxyalkyl alpha-hydroxyalkylphosphonate product mixtures which are used in the polyurethane-forming compositions of this invention involves four general steps, comprising (a) reacting a trivalent phosphorous trihalide such as phosphorous trichloride, phosphorous tribromide, and mixtures thereof including phosphorobromidochloridites with an alkylene glycol having from 2 to about 6 carbon atoms and having the glycol hydroxyl groups on adjacent carbon atoms, (b) reacting the resulting reaction product mixture of step (a) with an alkylene oxide having from 2 to about 6 carbon atoms and having the epoxy group in the terminal position, i.e., in the 1,2-position, in sufficient amount to react with at least some, e.g. from about one-twentieth to substantially all of the phosphorous bonded halogens, (c) reacting the reaction product of step (b) with sufficient alkanecarboxaldehyde to react with substantially all of any remaining phosphorous bonded halogen, (d) reacting the reaction product of step (c) with sufficient water and alkanecarboxaldehyde to open any cyclic phosphite ester rings and form the hydroxyalkyl alpha-hydroxyalkylphosphonate product mixture, which may be used as such in polyurethane forming recipes or which may be treated with a material which reacts with or neutralizes the acid moieties present in the mixture such as an epoxide or a basic material to give a product having an acid number sufficiently low to be acceptable to polyurethane producers.

A neutralizing agent as used in this invention means any material which has the chemical nature or characteristic of being able to reduce the acidity present when the neutralizing agent is admixed with the product mixture as obtained from step (d) of the above described process.

The theoretical mole ratio requirement of the several reactants used in this preferred process for preparing the hydroxyalkyl alpha-hydroxyalkylphosphonate component may be visualized from the following equations which set forth the relative proportions of the reactants. For chemical and economic reasons the actual quantities of each reactant may vary somewhat from the amounts shown by this equation:

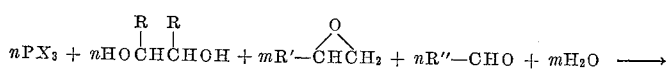 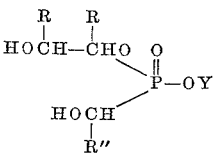

where Y is

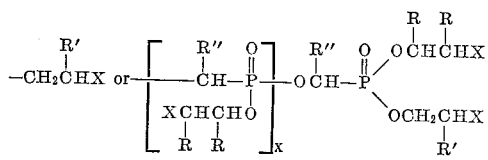

X is chlorine or bromine, each R is hydrogen or an alkyl group of from 1 to about 4 carbon atoms provided that when both R groups are alkyl the total carbon content of the two R groups is not more than about 4 carbon atoms, R' is hydrogen or an alkyl group having from 1 to about 4 carbon atoms, R'' is hydrogen or an alkyl group having from 1 to about 3 carbon atoms, $m$ and $n$ are relative ratio numbers where the value of $m$ varies from $n$ to about $n/20$, and $x$ is an average number ranging from 0 to about 18, depending upon the value of $m$. For example, when $m=n$, Y is largely

where $m=n/2$, $x$ is about 0; when $m=n/3$, $x$ averages about 1; and when $m=n/10$, $x$ averages about 8. It is preferred to conduct the process using $m$ quantities of the alkylene oxide and water ranging from about $n$ to about $n/3$. The following chemical equations represent the desired reaction of the preferred four-step process of this invention when $m=n/2$. For these equations, simple examples of each reactant and desired product are given for purposes of illustration only, and they are not given with the intent to limit the scope of the claimed process and product more than has been stated above.

STEP I

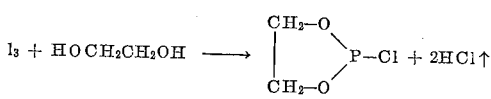

STEP 2

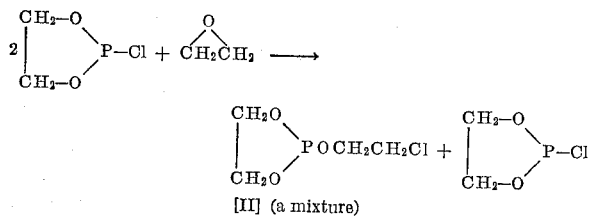

[II] (a mixture)

STEP 3

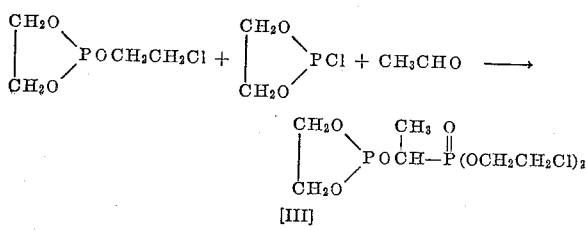

[III]

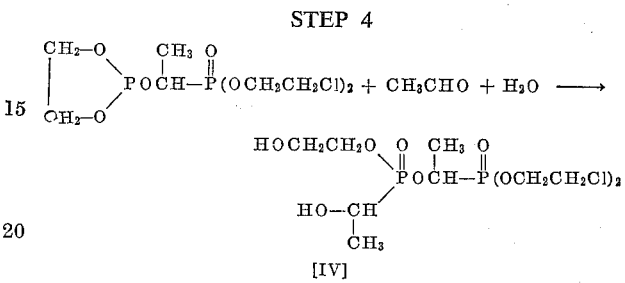

STEP 4

$$CH_2-O \diagdown POCH-P(OCH_2CH_2Cl)_2 + CH_3CHO + H_2O \longrightarrow$$
(with CH_3 group)

$$HOCH_2CH_2O \diagdown POCH-P(OCH_2CH_2Cl)_2$$
$$HO-CH$$
$$CH_3$$

[IV]

The reactants should be mixed in the order indicated by the above four equations. The water reactant of Step 4 may be added after all of the aldehyde for Steps 3 and 4 has been added, simultaneously with the aldehyde used in Step 4, or in solution with part of the aldehyde reactant.

In conducting the first step of the process it is preferred to use an excess of the phosphorus trihalide reactant, generally in quantities ranging up to about 25 percent molar excess relative to the amount of alkylene glycol reactant, with molar excesses of between about 5 percent to 15 percent being preferred, although stoichiometric quantities may be used if desired. The phosphorus trihalide is usually added in excess to compensate for material swept out of the reaction vessel by the hydrogen halide by-product. A small excess of the glycol over the stoichiometric quantity may be used without seriously affecting the product, but this is not preferred. Very little heating or cooling is required since the heat of vaporization of the hydrogen halide and return of phosphorus trihalide condensate almost balance the heat of reaction. The temperature used for this step may vary from about 0° to 80° C., but 10° to 50° is preferred. Atmospheric pressure is ordinarily used, but elevated pressures, say, up to about ten atmospheres may be employed. When the mixing is completed, any remaining hydrogen halide and excess phosphorus trihalide may be removed, e.g., by gradually reducing the pressure and warming the mixture moderately, say at 15 to 60°. (Care should be taken in this first step to insure that water does not come into contact with the reaction product since the mixture with water is explosive.) The crude product thus obtained is largely 2-halo-1,3,2-dioxaphospholane.

In the second step of this process the crude 2-halo-1,3, 2-dioxaphospholane reaction product of Step 1 is treated with sufficient alkylene oxide, depending on the molecular weight desired for the final product, to convert, say, from about one-twentieth to all of the halophospholane product to a 2-haloalkyloxy-1,3,2-dioxaphospholane. It is preferred to conduct the addition and reaction of the alkylene oxide with the 2-halo-1,3,2-dioxaphospholane product of Step 1 at about 0° C. to about 50° C. although somewhat lower and higher temperatures may be used.

In conducting Step 3 of the process the alkanecarboxaldehyde reactant is added gradually to the reaction product of Step 2 while cooling. It is preferred to allow the temperature to rise gradually from about 25°–35° C. at the start of the addition to about 70° C. or 80° C. at the end although any temperature sufficient to avoid cessation of reaction or decomposition of any substantial amount of material in the reaction mixture may be used. Since the viscosity of the reaction mixture increases, it may be desirable with some reactant combinations to add an inert, non-reactive diluent or solvent to reduce the viscosity. Diluents or solvents which may be used in the process of preparing these materials include any non-reactive inert material which can be substantially completely removed from the reaction product mixture, for example, ethylene dichloride, carbon tetrachloride, benzene, and toluene. However, we prefer to operate without the diluent and to heat the mixture as described above. Since aldehyde is also used in Step 4 of this process we prefer to add an excess of aldehyde in Step 3, say, up to 50% molar excess, to insure essentially complete reaction of the phosphorus-bonded chlorine or bromine. After such addition, hydrolyzable halogen is usually present only in very minor amounts, e.g., only to the extent of about 0.1 percent or less. However, less of an excess of aldehyde may be used in this step if desired.

In conducting Step 4 it is preferred to add a solution of the water reactant in the alkanecarboxaldehyde reactant to the reaction product of Step 3 at temperatures of about 20 to 80° C., although the water and alkanecarboxaldehyde reactants may be mixed with such reaction product separately, admixed, or in solution at higher or lower temperatures, say, 0° C. to about 100° C. The amount of water used in Step 4 may vary from about 10 percent to about 100% of theory but generally it is between about 40% to 85% of the theoretical amount. As indicated above, the water may be added after all of the aldehyde, simultaneously with part of the aldehyde or in solution with part of the aldehyde. In the preferred mode of operating this process the amount of water used is about 60-90% of the stoichiometric amount calculated for the desired reaction indicated above.

After the water and aldehyde have been added, the reaction mixture may be used as such for flame-retarding polymer systems. It is preferred, however, to first subject it to a mild vacuum stripping operation, say, to a pot temperature of about 50°–75° C. at 0.1–100 mm. of pressure before using it. The resulting product performs well, e.g., as a flame retarding material at concentrations as low as 3 to 5 percent by weight in polyurethane foam compositions. The quality of the fire retardant material may be improved, however, by first neutralizing part or all of the acidity present. It is preferred to neutralize the product with a basic material to an acid number sufficiently low to make the product acceptable to the users of the material in polymer systems. If the material is neutralized to an acid number below about 15, it is usually sufficient for most applications. However, for some applications it is desired to reduce the acid number as much as is possible, say to 0 to 5. Many basic materials may be used to accomplish this neutralization. For practical reasons of economics and to avoid undue contamination of the product with unwanted impurities, it is preferred to neutralize the prodct mixture with cheap alkali metal and alkaline earth metal hydroxides, carbonates, oxides, and alcoholates (alkoxides) or with ammonia and organic tertiary alkyl amines. Examples of the most economical and most readily available basic materials of these types which may be used include sodium hydroxide, calcium oxide, sodium acetate, sodium methoxide, sodium ethoxide, potassium and sodium carbonates, ammonia, ammonium hydroxide, trimethylamine, triethylamine, tripropylamine, pyridine, N-methylmorpholine, picoline, N-methylcyclohexylamine, etc. Reduction of the acidity may also be accomplished by treatment with expoxides, e.g., ethylene oxide, propylene oxide, butylene oxides and higher homologues. If needed, the acidity may also be reduced by ion exchange resins. Those skilled in the art are well able to determine which is the best neutralizing agent or basic material to use to netutralize the reaction mixture product component of this invention. In our operation of the process, we prefer to use a solution of sodium methylate (sodium methoxide) in methanol or a lower trialkyl- amine such as trimethylamine, triethylamine, or ammonia. After neutralization, it may be advantageous to again strip the reaction mixture to a pot temperature of said 40–100° C. at reduced pressure.

Analytical data, particularly $P^{31}$ nuclear magnetic resonance spectra of the intermediate reaction products, indicate that several structures other than those desired may be present in the final product. Such structures that may be obtained when the reactants used in the process are $PCl_3$, ethylene glycol, ethylene oxide, acetaldehyde, water, and sodium methoxide are listed below:

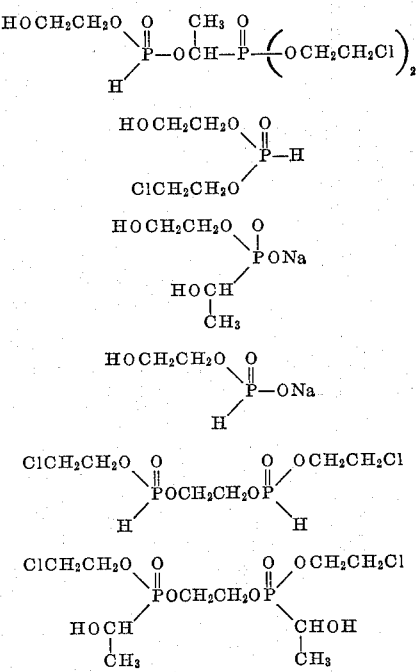

Alternatively, the hydroxyalkyl alpha-hydroxy-alkyl-phosphonate component may be prepared by using as starting material compounds which may be obtained by reacting (1) a 2-halo-1,3,2-dioxaphospholane ester wherein the halogen in the 2 position is chlorine or bromine with (2) an alkanecarboxaldehyde having from 1 to about 4 carbon atoms, and (3) a neutral trivalent phosphorus ester having at least one ester radical thereof being either an alkyloxy group having from 1 to about 6 carbon atoms, a chloroalkyloxy group having from 2 to about 6 carbon atoms, or a bromoalkyloxy radical having from 2 to about 6 carbon atoms, the remaining groups on the neutral trivalent phosphorus ester being either alkoxy having from 1 to about 6 carbon atoms, chloroalkyloxy having from 2 to about 6 carbon atoms, and bromoalkyloxy radicals having from 2 to about 6 carbon atoms, or alkyl groups having from 1 to about 6 carbon atoms, in about equimolar proportions until the heat of reaction has subsided, and then reactaing this resulting reaction product with sufficient alkanecarboxaldehyde and water as described above to open the phospholane ester ring and to form the desired alpha-hydroxylalkylphosphonate.

The part of this alternative process which involves the reaction of the 2-halo-1,3,2-dioxaphospholane, aldehyde, and neutral trivalent phosphorus ester may be accomplished according to the procedure described in U.S. Patent 3,014,948 which issued Dec. 26, 1961. The alternative process involves the use of those materials as intermediates or reactants for preparing the difunctional products of this invention. The treatment of those intermediate materials with acetaldehyde and water according to the process of this invention is the same as the above described Step 4.

For reasons of cost and availability it is preferred to use phosphorus trichloride as the phosphorus trihalide reactant in Step 1 of the preferred process. However, phosphorus tribromide may also be conveniently used as well as mixed phosphorobromidochlorides, if desired, to obtain increased flame-resistance in the polymer system to which the product is added.

The alkylene glycols used in Step 1 are those having the glycol hydroxyl groups on adjacent carbon atoms, and preferably have from 2 to about 6 carbon atoms, although alkylene glycols having somewhat more carbon atom content may be used if desired. Examples of alkylene glycols which may be used include ethylene glycol, 1,2-propylene glycol, 1,2-butylene glycol, 2,3-butylene glycol, 1,2-pentylene glycol, 2,3-pentylene glycol, 3-methyl-1,2,-pentylene glycol, 1,2-hexylene glycol, 2,3-hexylene glycol, 3,4-hexylene glycol, etc.

The terminal alkylene oxides used in Step 2 of the preferred process of this invention likewise preferably have from 2 to about 6 carbon atoms. Alkylene oxides having more carbon atoms could be used but the use of such materials reduce the flame retardant effectiveness of the final product. Hence, we prefer to limit the alkylene oxide reactant to such materials as ethylene oxide, propylene oxide, 1,2-butylene oxide, 1,2-pentylene oxide, 3-methyl-1,2-pentylene oxide, and 1,2-hexylene oxide.

The alkanecarboxaldehydes used in Steps 3 and 4 of the preferred process preferably have from 1 to 4 carbon atoms therein, although longer chain alkanecarboxaldehydes could be used in the reaction. For reasons of simplicity of operation of the process, it is desirable to use the same aldehyde in Step 4 as was used in Step 3, although this is not necessary. However, since it is preferred to add an excess of the aldehyde in Step 3 to insure complete reaction of all phosphorus-bonded halogen therein, it is easier to use a common aldehyde in both steps, the excess aldehyde used in Step 3 merely being carried over for reaction along with any additional aldehyde with water and the intermediate products of Step 3 for formation of the alpha-hydroxyalkylphosphonate product in Step 4. Examples of aldehydes which may be used include formaldehyde, acetaldehyde, propionaldehyde, butyraldehyde, and isobutyraldehyde. Mixtures of aldehydes may also be used. Lower dialkyl ketones such as acetone and methyl ethyl ketone could be used but with less advantageous results.

The water used in Step 4 of the process may be distilled or ordinary tap water. Since side reactions occur with the first three steps, and the desired phospholane structures are usually present in less than theoretical quantities in the Step 3 product, somewhat less than the theoretical amount of water is needed to complete the reaction in Step 4. The amount needed generally varies from about 60 to 90% of theory, depending on the types and ratios of reactants used. It may sometimes be advantageous to prepare products that contain some unreacted Step 3 product as a mixture with ordinary Step 4 product. This can conveniently be done by using less water than the amount that is normally required to complete the reaction, say, as little as 10% of theory. The hydroxyl content of the final product can be regulated in this way.

The hydroxyalkyl alpha - hydroxyalkylphosphonate product mixtures are particularly useful in polyurethane type polymerization recipes where they may be incorporated into the reaction mixture in quantities ranging from about 0.1 percent to about 10 percent by weight to impart good flame resistance to the resulting polymer system without substantially affecting the good physical properties of the polyurethane composition.

Copending application Ser. No. 374,270 filed June 11, 1964, which describes in more detail how the hydroxyalkyl alpha-hydroxyalkylphosphonates are prepared is incorporated herein by reference to avoid unduly lengthening this specification.

The hydroxyalkyl alpha - hydroxyalkylphosphonate product mixture may be combined with the polyol and/or the polyisocyanate, or catalyst reactants in any of several ways. Each of the polyol, polyisocyanate, catalyst, and hydroxy alkyl α-hydroxyalkylphosphonate materials may be metered and pumped into a common mixing vessel, and then the resulting mixture may easily be moved to the polymerization site for use in molds, slab stock operations, etc. The hydroxyalkyl α-hydroxyalkylphosphonate may also be admixed with the polyol reactant before it is combined with the polyisocyanate reactant. It is also within the scope of the invention to mix the hydroxyalkyl α-hydroxyalkylphosphonate with the polyisocyanate before combining such mixture with the polyol reactant. However, if the polyisocyanate and the hydroxyalkyl α-hydroxyalkylphosphonate are mixed and allowed to stand at room temperature for a substantial period of time, reaction may occur. Hence, it is preferred to mix the polyol, polyisocyanate, and the hydroxyalkyl α-hydroxyalkylphosphonate components either simultaneously or to first mix the polyol and the hydroxyalkyl α-hydroxyalkylphosphonate and then combine this mixture with the polyisocyanate.

An organic polyol, including diols, polyols, and polyether, polyester, and polyesteramide polyols having hydrogen atoms that are reactive with isocyanates may be used. Generally these materials have molecular weights ranging from about 62 to about 5000 and have from 2 to about 8 or 10 or more hydroxyl groups per molecule and weight percent hydroxyl contents ranging from about 0.5 to about 25%. Some have even higher hydroxyl content. They generally have hydroxyl numbers of from about 50 to as high as 500 or even 700. In the polyester-polyol type of reactant the acid number should be less than 10 and is usually as close to 0 as possible. These materials are referred to conveniently as the "polyol" reactant. The useful active hydrogen-containing polyols include the large family of adduct compounds which result when ethylene oxide, propylene oxide, 1,2- and 2,3-butylene oxide, or other alkylene oxides are added to such active hydrogen compounds as glycols and polyols represented by ethylene glycol, propylene glycol, glycerine, methyl glucoside, sucrose, sorbitol, hexanetriol, trimethylol propane, pentaerythritol as well as various alkylamines and alkylenediamines, and polyalkylenepolyamines and the like. Various amounts of these alkylene oxides may be added to the base polyol or amine molecules referred to, depending upon the intended use of the polyurethane. For example, when a final polyurethane is desired which is flexible, one would use more alkylene oxide than for a more rigid polyurethane.

For example, a polyol for use in making flexible foams could be well represented by glycerine to which sufficient propylene oxide was added to give a final hydroxyl content of about 1.7%. Such a material would have a molecular weight of about 3000 and have a molar ratio of glycerine to propylene oxide of about 1 glycerine to 50 propylene oxide. This technique of controlling rigidity or flexibility by selection of the polyol molecule and the subsequent amount of alkylene oxide added is well known to those in the art. Our method of incorporating the hydroxyalkyl α-hydroxyalkylphosphonates is equally applicable to the various materials resulting from such described technology. In addition to the glycols and the like which can serve as a base polyol molecule for addition of the alkylene oxides and thus yield the "polyol" molecule for reaction with the polyisocyanate, one can use a starting molecule which contains primary and/or secondary amine groups which have hydrogen reactive toward alkylene oxides. Here also, the quantity of alkylene oxide added depends upon the intended use of the final polyurethane products. Again, for flexible products where more alkylene oxide would be used to produce polyols with lower hydroxyl content, say, from about 0.1% to 5% or 10%, than for more rigid polyurethanes where polyols having weight percent hydroxyl content of from about 10% to 15% or 20%, typically, 10% to 12%, are often used. Representative amines which may serve as active hydrogen-containing molecules for reaction with epoxides are those having from 1 to about 6 or more amino nitrogens, examples of which are ethylamine, ethylenediamine, diethylenetriamine, triethylenetetramine, tetrapropylenepentamine and other linear saturated aliphatic alkylene amines, the important requirement being the presence of at least two, and preferably more, say 3 to 8 or 10 active hydrogen sites to which the alkylene oxide may be added. Our hydroxyalkyl α-hydroxyalkylphosphonate products may be beneficially used with these polyols also. It is also well known to use the hydroxyl bearing molecules which have been prepared by esterification type reactions from polyfunctional acids or anhydrides and polyfunctional alcohols as the active hydrogen compounds used in preparing polyurethane systems. These compounds are often called polyester-polyols. We can also use our hydroxyalkyl α-hydroxyalkylphosphonates in these systems with good results. Typical acids used for making these polyester-polyols are maleic, phthalic, succinic, fumaric, tetrahydrophthalic, chlorendic and tetrachlorophthalic acids. Typical polyols are ethylene, propylene, butylene, diethylene and dipropylene glycols, and polyethylene, polypropylene glycols and glycerine, trimethylol propane, hexanetriol, pentaerythritol, sorbitol, and the like. Where available, the above mentioned acids may be used in the anhydride form if desired.

In making the polyester-polyols, any of the various polyfunctional acids or anhydrides or mixtures thereof are caused to react with any of the glycols or polyols or mixtures thereof, using a stoichiometric excess of the hydroxyl groups such that the final polyol product contains predominantly hydroxyl end groups. The degree of hydroxyl functionality and the percent hydroxyl is easily varied to provide the desired polyols by technology and techniques which are known to those in the art. We are not concerned with these techniques but rather with the use of these well known products along with the hydroxyalkyl α-hydroxyalkylphosphonates to provide reduced flammability in the final polyurethane product.

In the art and technology of making polyurethanes, it is also known to employ what is called prepolymer techniques. This is a technique wherein part of the reaction involved in making a polyurethane is carried out yielding a prepolymer of increased molecular weight and with either resultant end groups of hydroxyls or isocyanates depending upon the stoichiometry used in making this prepolymer. This prepolymer is then used to prepare the desired final polyurethane product by reacting it with either a polyisocyanate or one of the desired polyols, depending, as has been mentioned above, on whether the terminal groups of the prepolymer are hydroxyls or isocyanates, respectively. We can use our hydroxyalkyl α-hydroxyalkylphosphonates advantageously in these systems also.

Broadly, any of the prior art polyesters, polyisocyanate-modified polyester prepolymers, polyesteramides, polyisocyanate-modified polyesteramides, alkylene glycols, polyisocyanate-modified alkylene glycols, polyoxyalkylene glycols and polyisocyanate-modified polyoxyalkylene glycols, etc., having free reactive hydrogens and especially hydroxyl groups may be employed for the production of the fire-resistant polyurethanes in accordance with this invention.

Polyols as exemplified above are reacted with organic polyisocyanates to prepare polyurethanes. Broadly, the term "polyisocyanate" as used herein, means any of the prior art polyisocyanates that have been or could be used to prepare polyurethanes. The term includes monomeric di- and polyisocyanates and prepolymers of polyols and polyisocyanates where the isocyanate groups are in excess so that there are free available isocyanate groups available to react with additional polyol and the hydroxyalkyl α-hydroxyalkylphosphonate when they are combined with the polyisocyanate to form the fire-resistant polyurethane polymer of this invention. The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2-diisocyanate, and the arene polyisocyanates having from 2 to 3 isocyanate groups per molecule and from 1 to 3 phenylene rings as the only aromatic cyclic ring systems such as m-phenylene diisocyanate, 2,4-toluene diisocyanate, 1,6-toluenediisocyanate, 3,3'-dimethyl- as well as various other polyisocyanates such as 4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate, and the like.

Useful catalyst, and/or initiator materials which may be used as the "catalyst" component include the tertiary amines either individually or in mixture like N-alkylmorphoines, and N,N-dialkylcyclohexylamines, where the alkyl groups are methyl, ethyl, propyl, butyl, etc., also triethylamine, tripropylamine, tributylamine, triamylamine, pyridine, quinoline, dimethylpiperidine, dimethylhexahydroaniline, diethylhexahydroaniline, the reaction products of N,N'-diethylaminoethanol and phenyl isocyanate, esterimides, 1-methyl-4-(dimethylaminoethyl) piperazine, N-ethylethylenimine, N,N,N',N'-tetramethyl-1,3-butanediamine, triethylamine, 2,4,6-tri(dimethylaminomethyl) phenol, tetramethylguanidine, N-ethylmorpholine, 2-methylpyrazine, dimethylaniline, and nicotine; and metallic compounds including those of bismuth, lead, tin, titanium, iron, antimony, uranium, cadmium, cobalt, thorium, aluminum, mercury, zinc, nickel, cerium, molybdenum, vanadium, copper, manganese, zirconium, etc., examples of which include bismuth nitrate, lead 2-ethylhexoate, lead benzoate, lead oleate, sodium trichlorophenate, sodium propionate, lithium acetate, potassium oleate, tetrabutyl tin, butyl tin trichlorate, stannic chloride, tributyl tin o-phenylphenate, stannous octoate, stannous oleate, dibutyl tin di(2-ethylhexoate), di(2-ethylhexyl) tin oxide, titanium tetrachloride, tetrabutyl titanate, ferric chloride, antimony trichloride, cadmium diethyl dithiophosphate, thorium nitrate, triphenyl-aluminum, nickelocene, etc. The catalyst component either as single compound or as a mixture may be used in conventional amounts, which usually ranges from about 0.05 to about 4 parts of catalyst per 100 parts of polyol-isocyanate reactants by weight.

Polyurethanes are used in both the unfoamed and in the so called "foam" form. In general, a foamed polyurethane is formed when low boiling liquids, or normally gaseous blowing agents, or inflatants are generated by or incorporated into the polyurethane-forming reactants. Often the heat of reaction causes these low boiling liquid or gaseous blowing agents to volatilize, thus foaming the composition. In some cases the boiling point of the blowing agent is chosen to be well below room temperature, and the composition can be made to foam even before any substantial reaction between the polyol and the polyisocyanate reactants has occurred or before any heat is evolved. This technique is sometimes called frothing. Useful blowing agents, i.e., foam inducing agents, which may be added when foams are desired include water, either alone or admixed with other components, e.g., as an aqueous solution of a tertiary amine catalyst, and the chlorinated and fluorinated alkanes having from 1 to about 2 carbon atoms, such as the chlorofluoromethanes and chlorofluoroethanes, which are commercially available under various trademarks, one of such being "Freon."

When blowing or foaming agents are incorporated into the reactant composition, there may also be incorporated into the mixture various conventional foam stabilizers to control the amount and quality of the foamed polyurethane obtained. Used for this purpose are various surfactants including various silicone compounds and silicone oil mixtures, e.g., dimethyl-siloxane and alkylsilane-polyoxyalkylene glycol copolymers sold under various trade names such as "Silicone L-520" and "Dow Corning 199" etc. For foaming or blowing polyurethane polymers there may be used from about 5 to about 50 parts by weight of blowing agent and about 0.1 to 3 parts of the foam stabilizing agent per 100 parts by weight of the polyol and polyisocyanate reactants.

While preparing the fire resistant polyurethanes in accordance with this invention, the hydroxyalkyl α-hydroxyalkylphosphonate product may be added to a "1-shot" mixture of the polyol, polyisocyanate, and catalyst ingredients before hardening. It may also be added to a prepolymer prepared from the active hydrogen compound and the polyisocyanate previous to or simultaneously with the activator mixture. The polyol and polyisocyanate reactants are usually in proportions sufficient to provide an NCO/OH ratio of about 1.05/1. In this invention the polyisocyanate is used in proportions sufficient to provide sufficient isocyanate groups to be equivalent to amounts of both the hydroxyl content and the amount of hydroxyalkyl α-hydroxyalkylphosphonate. Usually a small excess of isocyanate reactant is used to insure complete reaction. Thus, it is preferred to combine the polyisocyanate, polyol, and hydroxyalkyl α-hydroxyalkylphosphonate product in proportions sufficient to provide an NCO/OH plus hydroxyalkyl α-hydroxyalkylphosphonate ratio of about 1.05/1 although the art is aware that strict adherence to this ratio is not essential. As an example, in flexible foams where the blowing is often accomplished using $CO_2$ which results from reaction of water with isocyanate, large excesses of isocyanate are often used. The reaction mixture thus obtained may be metered and pumped during the induction period to the polymerization site where it may be readily poured, sometimes into suitable molds, by use of conventional equipment. The hardened pieces or foams are rendered flame-retardant by the inclusion therein of the hydroxyalkyl α-hydroxyalkylphosphonate in quantities of say from 2% to about 20% by weight, based on the total composition. Substantial flame resistance may be obtained with much smaller quantities, say, as little as from 0.5 to 1% by weight. The phosphorus contained in the resulting polyurethane is uniquely bonded therein and does not substantially impair the good mechanical properties of the polyurethane product obtained.

The polyurethanes obtained according to the process of this invention may be used in any of the fields where polyurethanes have previously been used. The flexible foamed phosphorous-containing polyurethanes of this invention may be used for seat cushions, upholstery, crash pads, etc. The rigid polyurethanes are very useful in structural applications, for example, as insulation panels, and for other building purposes. Non-foamed polyurethanes produced by this invention are useful in the production of textile fibers, as resin bases in the manufacture of curable coating compositions. They are also useful as impregnating adhesives in the fabrication of laminates for woods and other fibrous materials.

We have found that when the hydroxyalkyl α-hydroxyalkylphosphonates are incorporated into the polyurethane foam system in the manner described herein, the resulting polyurethane foam is a high-quality, flame-resistant foam at low concentrations of the product mixture. The following examples will better illustrate the nature of the present improvement in terms of processability, flame resistance, and polyurethane quality.

*Example 1*

This example illustrates the preferred procedure for preparing the hydroxyalkyl alpha-hydroxyalkylphosphonate component used in the polyurethane composition of this invention.

A 3-liter flask equipped with a thermometer, stirrer, dry ice condenser and graduated addition funnel was charged with 1265 g. (9.2 moles, 15% excess) of $PCl_3$. Ethylene glycol, 496 g. (8.0 moles), was then added above the surface in 1.1 hours (the addition was started at 25°, and when the temperature had fallen to 15°, slight warming was used to keep it at 15–20° during the remainder of the addition). The dry ice condenser was then replaced with an air-cooled condenser. The reaction mixture was warmed to 25° in 0.1 hour, water pump vacuum was applied, warming was continued to a pot temperature of 41°/10 mm., condenser water was turned on and the reaction mixture was refluxed for 0.5 hour at a pot temperature of 37–38°/8 mm. (73 g. of crude $PCl_3$ was collected in a dry ice trap during this stripping operation). The crude chlorophospholane intermediate contained 27.8% of hydrolyzable chlorine (theory, 28.0%). The $P^{31}$ n.m.r. spectrum had a major peak at −168.3 p.p.m., a minor peak at −179.7 p.p.m., and a minor doublet at −23.2 and +6.2 p.p.m. (*Caution*.—2-chloro-1,3,2-dioxaphospholane is explosive with water, and no operation should be carried out under conditions that could allow water to come into contact with it.)

The product from Step 1 was cooled to 30°, and 176 g. (4.0 moles) of gaseous ethylene oxide was added below the surface with nitrogen in 0.25 hour with cooling at 24–30°. When the cooling bath was removed at the end of the addition, heat of reaction raised the temperature from 28–35° in 0.1 hour. ($P^{31}$ n.m.r.: major peaks at −169.5 and −134.3 p.p.m.; minor peaks at −167.4 and −140.1 p.p.m.; small doublet at −23.5 and +6.2 p.p.m.)

The reaction mixture was stirred at 34–35° for 0.25 hour, and then 264 g. (6.0 moles) of redistilled acetaldehyde was added below the surface in 0.55 hour with cooling at 34–70° (one-fourth at 34–45° in 0.15 hour, one-fourth at 45–60° in 0.15 hour, one-fourth at 60–65° in 0.1 hour and the remainder at 65–70° in 0.15 hour). The reaction mixture was stirred and allowed to cool to 54° in 0.5 hour ($P^{31}$ n.m.r.: major peaks at −137.1 and −22.9 p.p.m.; minor peaks at −141.6, −134.1 and +6.6 p.p.m. Infrared bands: 2975–2900 cm.$^{-1}$; 1470–1380 cm.$^{-1}$; 1260 cm.$^{-1}$; 1210, 923, 810–720 cm.$^{-1}$; 1110–960 cm.$^{-1}$). A solution of 57.6 g. of tap water in 132 g. of redistilled acetaldehyde was then added with cooling at 53–57° in 0.4 hr. (the first half of the addition was made slowly in 0.25 hour to aid cooling, and then the rate of addition was increased as heat of reaction diminished). The mixture was stirred for 0.1 hour, and it was then stripped at 50–55° by slow reduction of pressure to 10 mm. and finally warmed to 75°/10 mm. to give 1502 g. of a colorless liquid (molecular weight: 472 by vapor pressure osmometry in acetonitrile; $P^{31}$ n.m.r.: −26.9 and −21.3 p.p.m.). The acidity of the residue was measured by non-aqueous potentiometric titration, and then a 1350 g. portion was stirred and cooled at 50–55° as 162 g. of a 25% solution of sodium methylate in methanol (the calculated amount for neutralization) was added in 0.25 hour. The reaction mixture was stirred for 0.1 hour more and then stripped as before to give 1392 g. of colorless product; $n_D^{25}$ 1.4792; total acidity, 1.4 mg. KOH/g.

*Analysis.*—Calcd. for $C_{10}H_{22}Cl_2O_8P_2$: C, 29.8; H, 5.5; Cl, 17.6; P, 15.4; OH, 8.4. Found: C, 28.8; H, 5.7; Cl, 16.4; P, 15.4; OH, 6.9.

The $P^{31}$ n.m.r. spectrum had major peaks at −27.4 and −21.7 p.p.m. and a minor peak at +6 p.p.m.

| Infrared bands, cm.$^{-1}$: | Assignments |
|---|---|
| 3390 | OH |
| 3000–2900 | CH |
| 1460–1380 | $CH_2$, $CH_3$ |
| 1240 | P=O |
| 1080, 1030, 965 | P—O—C |

*Example 2*

In this run the same procedure was used as in Example 1 except that the product was not stripped before sodium methoxide was added. A colorless liquid was obtained having the following properties: $n_D^{25}$ 1.4827; acid no., 17; $P^{31}$ chemical shifts, −27.8 and −22.2 p.p.m.; percent P, 15.5; percent Cl, 16.7; percent OH, 7.1.

Example 3

Following a procedure similar to Example 1 except that one-third more acetaldehyde was used in the water addition step and then triethylamine instead of sodium methylate was added for neutralization, a product was obtained having the following properties: $n_D^{25}$ 1.4862; $P^{31}$ chemical shifts: major peaks, −27.5 and −21.6 p.p.m.; minor peaks −24.5, −15.7 and +5.3 p.p.m.; percent P, 15.4; percent Cl, 17.4; percent OH, 6.9.

Example 4

This example illustrates the preparation of fire-resistant polyurethanes by the method of this invention in which the hydroxyalkyl alpha-hydroxyalkylphosphonate was blended with the polyol component in amounts sufficient to provide the final polyurethane with from about 0.9 percent to about 1.5 percent phosphorus therein. For this example the product mixture was prepared from phosphorus trichloride, ethylene glycol, ethylene oxide, acetaldehyde, and water admixed in that order in relative molar ratios such that $m$ equals about $n/2$ so that the desired product is one of the above formula where Y is

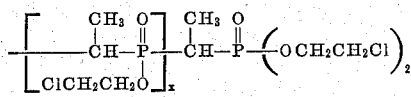

and $x$ is about zero. In this case, the water was used about 100% of theory, and the phosphorus trichloride and acetaldehyde were used in slight excess of theory to insure complete reaction of ethylene glycol and all phosphorus bonded chlorine in Steps 1 and 3, respectively. The product mixture had 15.4% P, 8.0% hydroxyl, and 17.2% Cl, and was one designed to have the theoretical structure.

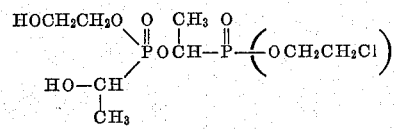

which for convenience is referred to herein as "Product A."

| Ingredients | Parts by Weight | | |
|---|---|---|---|
| | 0.9% P | 1.2% P | 1.5% P |
| "Product A" | 23.7 | 31.6 | 39.5 |
| Propoxylated Methyl Glucoside [1] | 147.7 | 141.4 | 135.0 |
| "Freon 11" [2] | 58.3 | 58.3 | 58.3 |
| TMBDA [3] | 4.0 | 4.0 | 4.0 |
| "Silicone L-520" [4] | 1.6 | 1.6 | 1.6 |
| "Polyisocyanate A" [5] | 176.3 | 174.7 | 173.2 |

[1] The methyl glucoside was treated with sufficient propylene oxide to obtain a product having about 13.2 percent hydroxyl, by weight.
[2] "Freon 11" is a trademark of Matheson Company for trichlorofluoromethane used as a blowing agent or inflatant
[3] TMBDA is N,N,N',N'-tetramethylbutanediamine used as catalyst in these compositions.
[4] "Silicone L-520" is a trademark name for an alkylsilanepolyoxyalkylene polymer silicone oil foam stabilizer (see U.S. patent 2,834,748).
[5] "Polyisocyanate A" is a commercial unpurified isomeric mixture of methylenebisphenylisocyanate, some molecules containing 3 aromatic rings and 3 isocyanate groups for a total NCO content of about 32%.

For each formulation all of the components except the polyisocyanate were blended to a homogeneous mixture, and then the polyisocyanate reactant was added and the mixture was blended thoroughly by stirring for 20 seconds. The blended formulations thus obtained were poured into paper lined boxes and allowed to react and rise to fine quality rigid foam materials. Samples were cut from the resulting foam loaf and tested for the flammability according to standard burning test ASTM D1692-59T (1959) except that no wire screen was used to support these rigid foam samples. Subjected to this burn test, each of the above foam samples containing 0.9%, 1.2%, and 1.5% phosphorus in the form of the above described product were rated self-extinguishing when the flame was removed.

Example 5

This example illustrates the preparation of fire resistant polyurethanes by the method of this invention using the same reactants as were used to prepare the flame retardant "product A" of Example 1, except that in the preparation of the flame retardant the reactants were used in relative molar ratios such that $m=n$ and the water was used in about 100% of theory. The product had 13.3% phosphorus, 14.6% hydroxyl, and 15.2% chlorine. Under such conditions of preparation the theoretical product structure was one in which Y was —CH₂CH₂Cl. The desired product structure would be

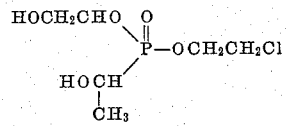

For convenience, this product is termed "Product B" herein below. The polyurethane making ingredients were compounded in the following proportions.

| Ingredient | Parts by Weight | | |
|---|---|---|---|
| | 1.0% P | 1.5% P | 2.5% P |
| Product "B" | 29.8 | 40.3 | 50.5 |
| Propoxylated Methyl glucoside | 135.4 | 124.0 | 120.3 |
| "Freon 11" [2] | 48.5 | 58.3 | 58.3 |
| "Silicone L-520" [3] | 1.6 | 1.6 | 1.6 |
| TMBDA [4] | 4.0 | 8.0 | |
| 1-Methyl-4-(dimethylaminoethyl) piperazine | | | 1.6 |
| Stannous Octoate | | | 0.5 |
| "Polyisocyanate A" [5] | | | |

[1, 2, 3, 4, 5] Same definitions as in Example 4.

The formulations were blended as described in Example 4, and samples of the resulting foam materials were tested for burn resistance according to same standard test method. Each of the three samples was rated "self-extinguishing."

Example 6

This example illustrates the preparation of a polyurethane using as a flame retardant a product mixture prepared from phosphorus trichloride, propylene glycol, ethylene oxide, acetaldehyde, water, and then neutralized with propylene oxide. The reactants were used in relative molar ratios such that $m=n$. The water was used in about 100% of theory. The product analyzed as having 10.6% phosphorus, 14.0% hydroxyl, and 12.3% chlorine. Under such circumstances of preparation, the desired product would be one having the structure

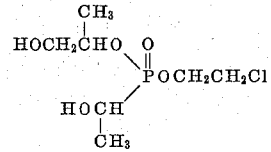

This material, termed "product C" herein, was compounded into three formulations for preparing polyurethanes using the following proportions:

| Ingredient | Parts by Weight | | |
|---|---|---|---|
| | 0.9% P | 1.2% P | 1.5% P |
| "Product C" | 34.5 | 46.0 | 57.4 |
| Propoxylated Methyl glucoside [1] | 131.0 | 119.1 | 107.3 |
| "Freon 11" [2] | 58.3 | 58.3 | 58.3 |
| "Silicone L-520" [3] | 1.6 | 1.6 | 1.6 |
| TMBDA [4] | 4.0 | 4.0 | 4.0 |
| "Polyisocyanate A" [5] | 183.2 | 182.6 | 183.0 |

[1, 2, 3, 4, 5] are as defined in Example 4.

The ingredients were blended into a formulation as described in Example 4, and allowed to foam to a rigid condition. Samples were cut from the foamed polyurethanes thus obtained and tested for burn resistance according to the standard test method identified above. Each of the three samples were rated "self-extinguishing."

What is claimed is:

1. A fire-resistant polyurethane prepared by incorporating into the reactant mixture used to prepare the polyurethane a fire resistance imparting amount of a product produced by a process comprising:

(a) reacting in the absence of water and at a temperature from about zero to 80 degrees centigrade an excess of a phosphorus trihalide selected from the group consisting of phosphorus trichloride, phosphorus tribromide, and mixtures thereof with an alkylene glycol having from 2 to about 6 carbon atoms and having the glycol hydroxyl groups on adjacent carbon atoms to form as a reaction product a 2-halo-1,3,2-dioxaphospholane ester;

(b) reacting the reaction product of step (a) with a 1,2-alkylene oxide having from 2 to about 6 carbon atoms in an amount sufficient to form as a reaction product at least some of a 2 - haloalkyl-1,3,2-dioxaphospholane wherein the halogen in the haloalkyl is the same as that in the phosphorus trihalide used in step (a), and the alkyl group has from 2 to about 6 carbon atoms;

(c) reacting the reaction product of step (b) with a sufficient amount of alkanecarboxaldehyde having from 1 to about 4 carbon atoms to react with substantially all of any remaining phosphorus bonded halogen;

(d) reacting at a temperature from about zero to about 100 degrees centigrade the reaction product of step (c) with a sufficient amount of alkanecarboxaldehyde having from 1 to about 4 carbon atoms and water to open dioxaphospholane ester rings and to form a hydroxyalkyl alpha-hydroxyalkylphosphonate ester product;

(e) reducing the acid number of the product of step (d) to no greater than about 15 with a basic material selected from the group consisting of alkali metal and alkaline earth metal hydroxides, lower alkoxides, alkali metal and alkaline earth metal salts, ammonia and tertiary lower alkylamines.

2. A fire-resistant polyurethane which is produced by reacting (A) a polyol, (B) an organic polyisocyanate, (C) a catalyst, and (D) a product which is prepared by a process comprising (a) reacting in the absence of water and at a temperature from about zero to about 80 degrees centigrade at least a stoichiometric amount of phosphorus trichloride with ethylene glycol to form a reaction product containing a 2-chloro-1,3,2 - dioxaphospholane, (b) reacting at about zero to about 50 degrees centigrade the reaction product of step (a) with ethylene oxide in an amount sufficient to form as a reaction product a mixture of 2-chloro-1,3,2-dioxaphospholane and 2-chloroethoxy-1,3,2-dioxaphospholane, (c) reacting the reaction product mixture of step (b) with a sufficient amount of acetaldehyde to react with substantially all of any phosphorus bonded chlorine, and (d) reacting at a temperature from about zero to about 100 degrees centigrade the reaction product of step (c) with a sufficient amount of acetaldehyde and water in an amount of about 10 to about 100 percent of theory to open phospholane ester rings and to form a hydroxyethyl alphahydroxyethylphosphonate ester product, said polyurethane containing from about 0.1 to about 3.5 percent by weight of phosphorus contributed by the hydroxyethyl alpha-hydroxyethylphosphonate ester product.

3. A fire-resistant polyurethane as described in claim 2 which is foamed by including with the reactants (E) a foaming agent, and (F) a surfactant.

4. A fire-resistant polyurethane foam prepared as described in claim 3 wherein the polyol (A) is a 2 to 4 carbon alkylene oxide adduct of a member of the group consisting of 1,1,3 - propylenetris(4 - phenol), glycerine, methyl glucoside, sorbitol, sucrose, trimethylolpropane, hexanetriol, linear saturated aliphatic amines having from 1 to about 6 amino nitrogens and from 2 to about 8 amino hydrogen, and mixtures of said polyols, said adducts having percent hydroxyl content of from about 0.5 to about 25 percent, the organic polyisocyanate (B) is an arene polyisocyanate having from 2 to 3 isocyanate groups per molecule and from 1 to 3 phenylene rings as the only aromatic ring system therein, the catalyst (C) is selected from the group consisting of a tertiary amine and mixtures of tertiary amines, the foaming agent (E) is a chlorofluoroalkane having from 1 to 2 carbon atoms, and the surfactant (F) is a silicone oil.

5. A fire-resistant polyurethane foam prepared as described in claim 4 wherein the polyol (A) is a propylene oxide adduct of methyl glucoside having a percent hydroxyl content of from 12 to 14 percent, the organic polyisocyanate (B) is an impure isomeric mixture of methylenebisphenyl isocyanates, some molecules containing 3 aromatic rings and 3 isocyanate groups and having a total isocyanate content of from about 31 to about 33 percent, the catalyst (C) is N,N,N',N' - tetramethylbutanediamine, the hydroxyethyl alpha-hydroxyethylphosphonate product (D) has an acid number no greater than about 15, the foaming agent (E) is trichlorofluoromethane, and surfactant (F) is an alkylsilanepolyoxyalkylene glycol silicone oil.

References Cited
UNITED STATES PATENTS

| | | | |
|---|---|---|---|
| 2,579,810 | 12/1951 | Fields | 260—953 |
| 3,014,948 | 12/1961 | Birum | 260—962 |
| 3,070,489 | 12/1962 | Newallis et al. | 260—953 |
| 3,092,651 | 6/1963 | Friedman | 260—2.5 |
| 3,179,629 | 4/1965 | Friedman | 260—77.5 |

DONALD E. CZAJA, *Primary Examiner.*

LEON J. BERCOVITZ, *Examiner.*

F. McKELVEY, *Assistant Examiner.*